(12) United States Patent
Bermudez Rodriguez et al.

(10) Patent No.: US 9,693,511 B2
(45) Date of Patent: Jul. 4, 2017

(54) INFRASTRUCTURES FOR VARIABLE RATE WATER DISTRIBUTION SYSTEMS

(71) Applicant: International Business Machines Corporation, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/562,912

(22) Filed: Dec. 8, 2014

(65) Prior Publication Data

US 2016/0157443 A1    Jun. 9, 2016

(51) Int. Cl.
*B05B 15/00*    (2006.01)
*A01G 25/16*    (2006.01)

(52) U.S. Cl.
CPC .................. *A01G 25/165* (2013.01)

(58) Field of Classification Search
CPC ...... A01G 25/02; A01G 25/023; A01G 25/16; A01G 25/162; A01G 25/165; B05B 1/20
USPC .......................................................... 239/542
See application file for complete search history.

(56) References Cited

U.S. PATENT DOCUMENTS

| | | | |
|---|---|---|---|
| 3,767,124 A | 10/1973 | Spencer | |
| 4,194,691 A * | 3/1980 | Birnbach | A01G 25/167 239/63 |
| 4,209,131 A * | 6/1980 | Barash | A01G 25/16 137/624.2 |
| 4,878,781 A * | 11/1989 | Gregory | E02D 3/10 405/36 |
| 4,930,934 A * | 6/1990 | Adkins | A01G 25/06 137/601.18 |
| 5,054,690 A | 10/1991 | Olson | |
| 5,133,622 A * | 7/1992 | Hewlett | A01G 25/06 405/39 |
| 5,228,469 A | 7/1993 | Otten et al. | |
| 5,246,164 A | 9/1993 | McCann et al. | |
| 5,337,957 A | 8/1994 | Olson | |

(Continued)

OTHER PUBLICATIONS

Coates et al., "Precision Irrigation in Orchards: Development of a Spatially Variable Microsprinkler System," Information and Technology for Sustainable Fruit and Vegetable Production, FRUTIC '05, Sep. 12-16, 2005, Montpellier, France, pp. 611-624.

(Continued)

*Primary Examiner* — Arthur O Hall
*Assistant Examiner* — Adam J Rogers
(74) *Attorney, Agent, or Firm* — Erik K. Johnson

(57) ABSTRACT

Embodiments of the present invention provide systems, methods, and computer program products for deploying infrastructures for variable rate water distribution systems. Embodiments of the present invention can afford users with the ability to control water distribution as well as modify existing infrastructures to meet dynamic target water distribution area demands. Furthermore, embodiments of the present invention may be used to provide users with accessibility to components for expedited servicing, modification, etc.

7 Claims, 6 Drawing Sheets

(56) References Cited

U.S. PATENT DOCUMENTS

| | | | | |
|---|---|---|---|---|
| 5,350,251 | A * | 9/1994 | Daniel | E01C 13/083 405/36 |
| 5,711,482 | A | 1/1998 | Yu | |
| 5,829,678 | A | 11/1998 | Hunter et al. | |
| 6,085,986 | A | 7/2000 | Yu | |
| 6,240,336 | B1 | 5/2001 | Brundisini | |
| 6,314,979 | B1 * | 11/2001 | Lips | A01C 23/042 137/205.5 |
| 6,464,152 | B1 | 10/2002 | Bolinis et al. | |
| 6,540,158 | B1 | 4/2003 | Vered | |
| 6,558,078 | B2 * | 5/2003 | Sowry | A01G 25/06 405/37 |
| 6,694,195 | B1 | 2/2004 | Garcia | |
| 7,108,205 | B1 | 9/2006 | Hashimshony et al. | |
| 7,899,580 | B2 | 3/2011 | Cardinal et al. | |
| 7,930,069 | B2 | 4/2011 | Savelle, Jr. et al. | |
| 8,160,750 | B2 * | 4/2012 | Weiler | A01G 25/16 239/69 |
| 8,443,822 | B2 | 5/2013 | Ivans | |
| 2004/0222325 | A1 | 11/2004 | Regev | |
| 2005/0121536 | A1 * | 6/2005 | Bavel | A01G 7/00 239/69 |
| 2006/0131442 | A1 * | 6/2006 | Ivans | A01G 25/16 239/104 |
| 2007/0189852 | A1 * | 8/2007 | Wolfley | A01G 25/02 405/36 |
| 2013/0060389 | A1 * | 3/2013 | Marsters | A01G 25/16 700/284 |
| 2013/0320106 | A1 * | 12/2013 | Schmidt | A01G 25/16 239/1 |
| 2014/0252112 | A1 | 9/2014 | Hamann et al. | |

OTHER PUBLICATIONS

Coates et al., "Control of individual microsprinklers and fault detection strategies," Precision Agriculture, vol. 7, No. 2, 2006, published online: Apr. 7, 2006, pp. 85-99, © Springer Science+Business Media, LLC 2006, DOI 10.1007/s11119-006-9001-1.

Coates et al., "Design of a System for Individual Microsprinkler Control," Transactions of the ASABE, vol. 49, No. 6, 2006, pp. 1963-1970.

Coates et al., "Wireless Network for Individual Emitter Control in Irrigation," VDI Berichte, vol. 1958, 2006, pp. 209-214.

Hamann et al., "Irrigation System," U.S. Appl. No. 13/792,751, filed Mar. 11, 2013.

* cited by examiner

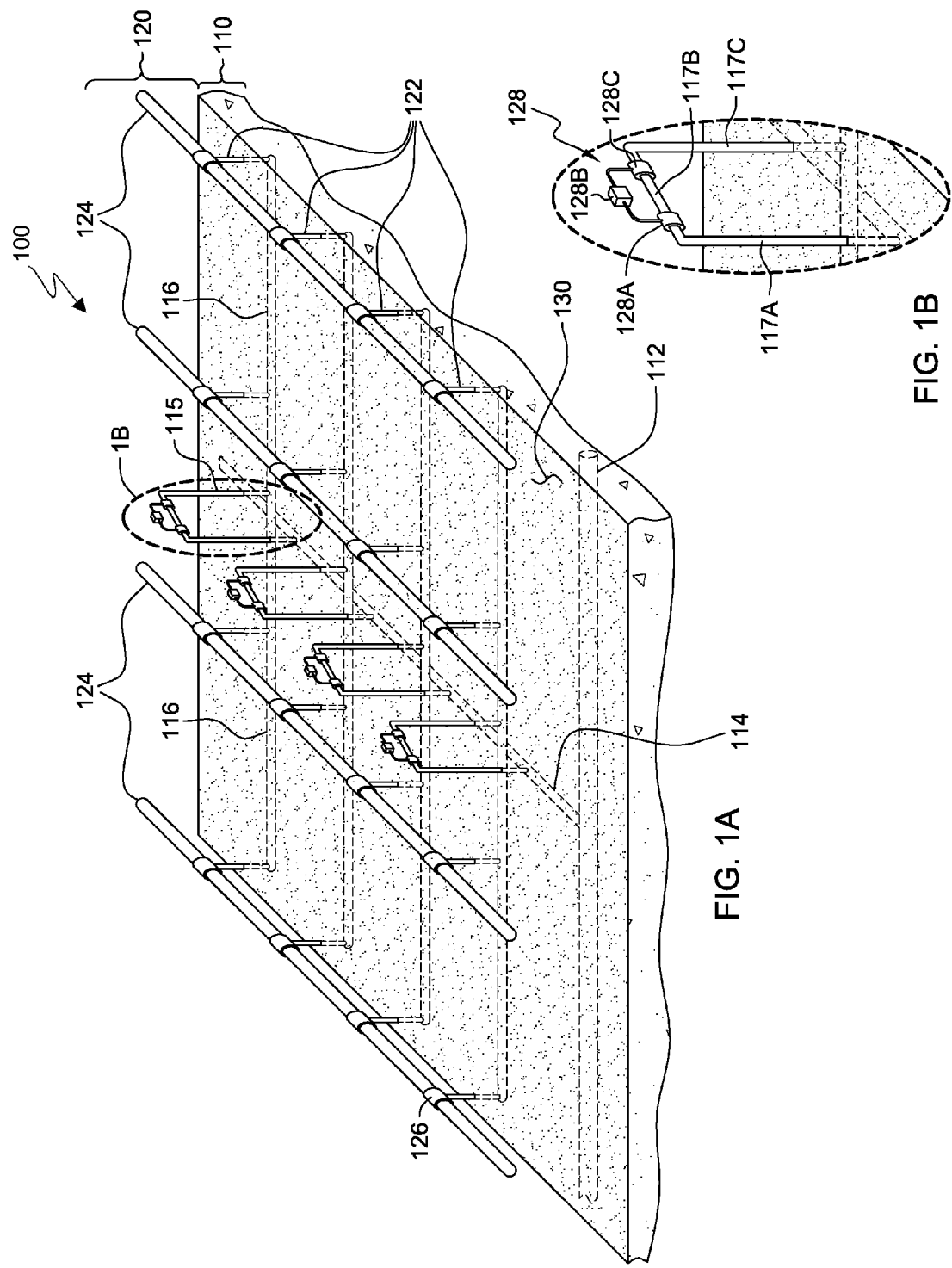

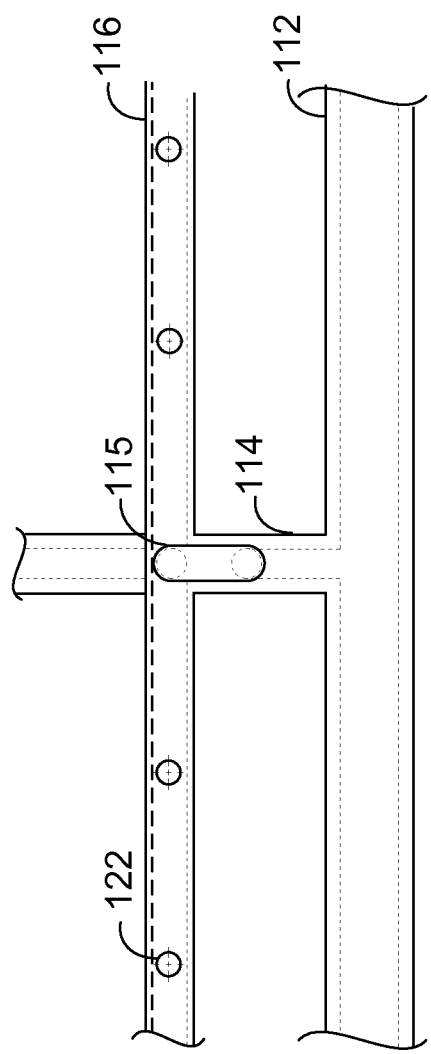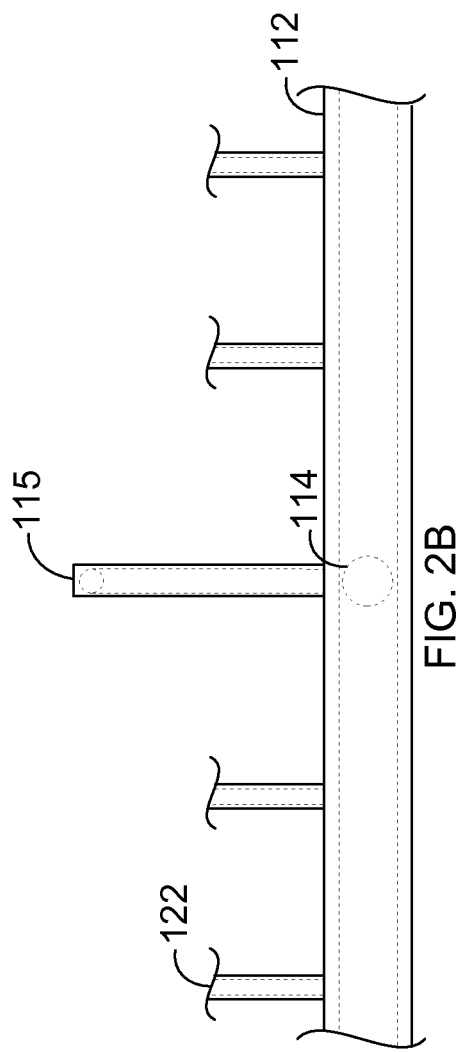

INFRASTRUCTURES FOR VARIABLE RATE WATER DISTRIBUTION SYSTEMS

FIELD OF THE INVENTION

The present invention relates generally to the field of water distribution systems, and more particularly to infrastructures of variable rate water distribution systems.

BACKGROUND OF THE INVENTION

Variable rate water distribution systems provide automated control for delivering liquid from a liquid source to target distribution areas. Variable rate water distribution systems may operate in large spatial areas with thousands of control elements arranged in complex infrastructures (e.g., building piping infrastructures, hothouses, garden centers, agricultural lands, etc.). Typically, variable rate water distribution systems comprise fixed (i.e., permanent) infrastructures to facilitate delivery of liquid to target distribution areas.

One such implementation of variable rate water distribution systems enables differential watering of crops for agricultural lands. For example, soil properties and crops (e.g., soil water holding capacity, types of crops, etc.) are rarely uniform throughout an entire target water distribution area. Variable rate water distribution systems address the dynamic water demands of different soils and crops by delivering a variable amount of water to different portions of the target water distribution area. For example, variable rate water distribution systems may deliver water to only a smaller portion of a large plot of agricultural land.

SUMMARY

Embodiments of the present invention provide systems and methods for a water distribution apparatus. In one embodiment, an apparatus is provided comprising: a first portion comprising: a supply line operatively coupled to a liquid source, a sub-supply line operatively coupled to the supply line, and a branch line operatively coupled to the sub-supply line; a second portion comprising: an extension component coupled to the branch line and the sub-supply line, wherein the extension component comprises at least one conduit and at least one control element configured to regulate flow, rising line operatively coupled to the branch line, and drip line operatively coupled to the rising line; and a communicative network operatively coupled to the at least one control element.

BRIEF DESCRIPTION OF THE DRAWINGS

FIGS. 1A and 1B are diagrams illustrating an infrastructure for a variable rate water distribution system, in accordance with an embodiment of the present invention;

FIGS. 2A and 2B are a plan view and an elevation view of an infrastructure, respectively, in accordance with an embodiment of the present invention;

DETAILED DESCRIPTION

Figure 3:
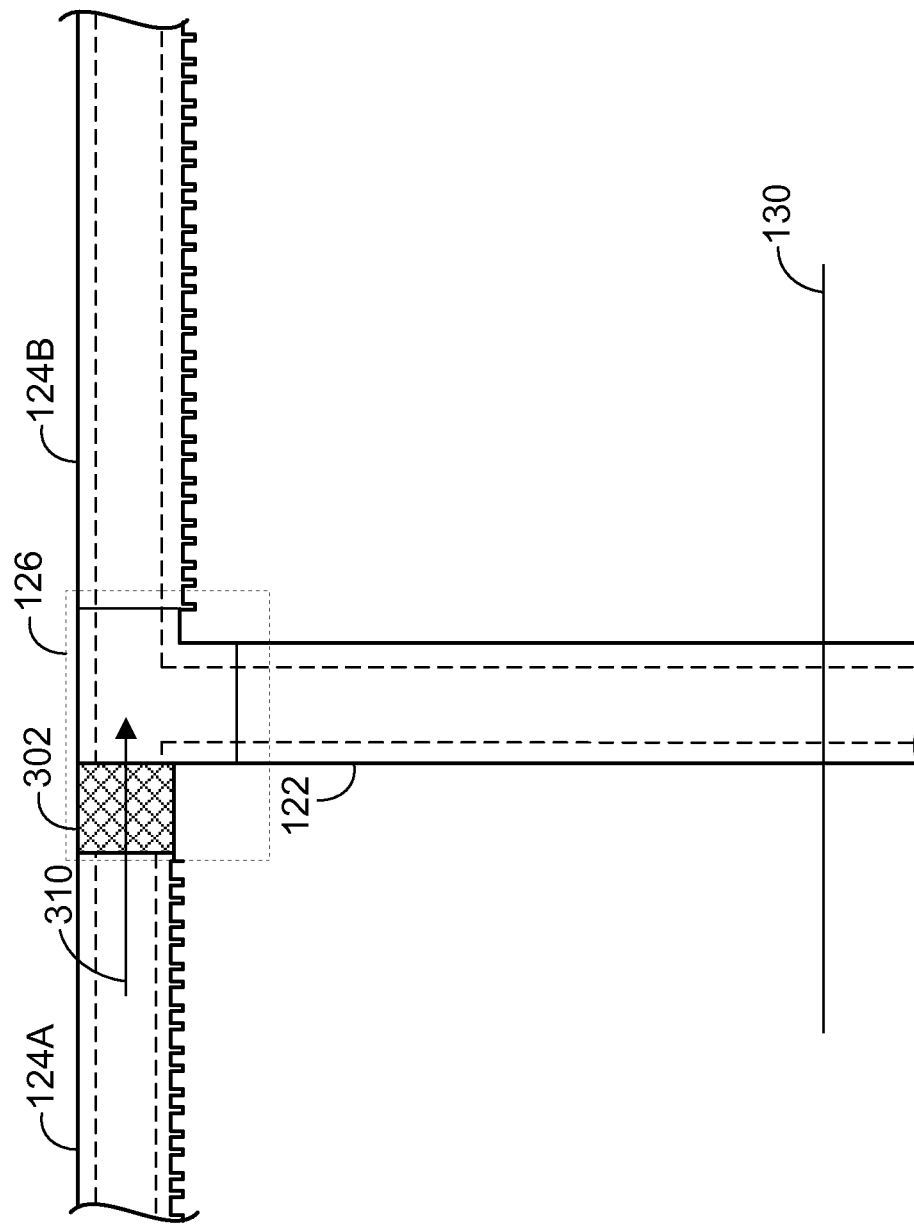
FIG. 3 is an elevation view of another portion of an infrastructure, in accordance with an embodiment of the present invention.

Embodiments of the present invention recognize that infrastructures of variable rate water distribution systems typically are permanently installed and can be difficult to access for servicing or modification. Embodiments of the present invention recognize a need for an infrastructure of a variable rate water distribution system where components are easily accessible for operation, servicing, or modification. Embodiments of the present invention provide, systems, methods, and computer program products for infrastructures of variable rate water distribution systems of target distribution areas. Embodiments of the present invention enable delivery of a variable amount of water to target distribution areas, such as via subsections of larger drip lines, and further provide the ability to efficiently modify an existing variable rate water distribution system.

Embodiments of the present invention prevent unintentional loss of water control which often results in undesirable, expensive, and dangerous outcomes. Variable rate water distribution systems deliver water to the different portions of the target water distribution area to ensure that the different needs of the soils and crops are being met. Accordingly, embodiments of the present invention provide the capability to modify existing infrastructure in order to meet dynamic demands of target water distribution areas (e.g., changing soil properties, crop rotation, etc.).

FIG. 1A is a diagram of infrastructure 100, in accordance with an embodiment of the present invention. In this embodiment, infrastructure 100 is a part of a variable rate irrigation system, which can be implemented alone or in combination with a fixed-rate irrigation system, such as where uniform irrigation is desired. In other embodiments, infrastructure 100 can be deployed in various environments, such as an infrastructure for plumbing in a building, an infrastructure for a sprinkler system in a golf course, an infrastructure for a network to deliver water to livestock. In general, infrastructure 100 can be implemented in any environment in which water is delivered from a liquid source to a target distribution area. Plane 130 represents a surface of a medium (smooth, contoured, irregular, etc.), that separates section 110 and section 120. In this embodiment, the medium is ground. In other embodiments, other mediums and combinations thereof can be present, depending on the environment in which infrastructure 100 is deployed. For example, infrastructure 100 may be deployed for a variable rate water distribution system in a sprinkling system for produce at a grocery store. Accordingly, in this implementation, plane 130 may represent the surface of a shelf that the produce rests on.

The term "conduit", as used herein, refers to any component (e.g., channel, pipe, tube, etc.) capable of transporting a liquid (e.g., water, diluted fertilizer, etc.) between components of infrastructure 100 without leakage. The phrase "operatively coupled", as used herein, refers to a joining or otherwise connecting two or more components to facilitate desired operation thereof. For example, a user may operatively couple conduits to facilitate flow from preceding and subsequent components. Similarly, a user may operatively couple electronic components to facilitate data transmission and communication between the electronic components. Operatively coupling components may be accomplished using any component or method known in the art. The phrase, "target water distribution area" or "target water distribution areas", as used herein, refers to desired areas for water distribution (e.g., irrigation areas, delivery to a faucet tap, etc.) during the operation of the variable rate water distribution system.

Section 110 comprises supply line 112, sub-supply line 114, a plurality of branch lines 116, portions of a plurality of rising lines 122, and portions of a plurality of extension components 115. Section 120 comprises plurality of rising lines 122, plurality of drip lines 124 and joint element 126. In this embodiment, components within section 110 and section 120 are operatively coupled to one another, via a plurality of joint elements 126.

Supply line 112 is a conduit that is operatively coupled to a liquid source (e.g., water pump, water supply, etc.) and sub-supply line 114. In this embodiment supply line 112 is disposed in section 110 (i.e., below-plane).

Sub-supply line 114 is a conduit that is operatively coupled to supply line 112, one or more branch lines 116, and one or more extension components 115. In this embodiment, sub-supply line 114 is disposed in section 110.

Branch lines 116 are conduits that are operatively coupled to extension components 115 and rising lines 122. In this embodiment, branch lines 116 are disposed in section 110. In general, a plurality of branch lines 116 are disposed throughout section 110 such that subsequent components are capable of distributing water to the entire target water distribution area. In this embodiment, plane 130 coincides with the target water distribution area. Branch lines 116 can receive water from sub-supply line 114 via one of extension components 115. In this embodiment, each one of extension components 115 facilitate the control of flow between sub-supply line 114 and branch lines 116.

Extension components 115 are disposed throughout a target water distribution area. In this embodiment, each of extension components 115 comprises control elements 128 and conduits 117A-C, wherein control elements 128 and conduits 117A-C are operatively coupled, such that liquid can flow from sub-supply line 114 to one or more branch lines 116. Control elements 128 are used to monitor and control flow of liquid from sub-supply line 114 to one or more branch lines 116. Furthermore, at least a portion of one of extension components 115 may be disposed in section 110 and another portion may be disposed in section 120. In other embodiments, a greater or lesser portion of one of extension components 115 is disposed in section 110 or section 120. In this embodiment, a plurality control elements 128 are operatively coupled to be the portion of one of extension components 115 disposed in section 110, as illustrated in FIG. 1B.

Control elements 128 comprise distribution valve 128A, control node 128B, and pressure sensor 128C. Control node 128B is operatively coupled to distribution valve 128A, pressure sensors 128C, as well as a communicative network, as described later in this specification with regard to FIG. 4. In general, control node 128B can transmit flow behavior response information (e.g., static pressure changes) from pressure sensor 128C and transmit instructions to distribution valve 128A through the communicative network. In this embodiment, control elements 128 are deployed on the portion of extension component 115 that is disposed in section 110. Accordingly, control elements 128 disposed in section 110 are easily accessible for a user of the variable rate water distribution system to replace, modify, or operate control elements 128. For example, one or more drip lines 124 and control elements 128 in a target irrigation area may be faulty. A user can easily access all components disposed in section 120 of the variable rate water distribution system. Accordingly, in this example, the user can easily access the one or more faulty drip lines 124 and control elements 128 for servicing, modification, or operation Rising lines 122 are a plurality of conduits that are disposed throughout plane 130. Rising lines 122 can transport water from components disposed in section 110 to components disposed in section 120. In this embodiment, each one of rising lines 122 is operatively coupled to one of branch lines 116 on a distal end and operatively coupled to one of drip lines 124 on a proximal end. At least a portion of each of rising lines 122 is disposed in section 110 and at least another portion is disposed in section 120. In other embodiments, a greater or lesser portion of one of rising lines 122 can be disposed in section 110 or section 120.

Drip lines 124 are a plurality of conduits that are disposed throughout the section 110. Drip lines 124 distribute liquid to the target water distribution areas. Each one of drip lines 124 comprises a plurality of emitters that are disposed along its length. For example, the emitters may be holes, nozzles, sprayers, or any component capable of dispensing water to a target water distribution area. Furthermore, a first drip line 124 of a sequence and/or a last drip line 124 of a sequence that are operatively coupled to one of branch lines 116 comprise a cap-component, configured to control liquid flow. For example, the cap-component may be closed such that water cannot exit one of drip lines 124.

FIG. 2A is a plan view of a portion infrastructure 100 and FIG. 2B is an elevation view of a portion infrastructure 100, in accordance with an embodiment of the present invention. Components of the infrastructure, as described with regard to FIG. 1, are disposed below plane 130. It should be appreciated that FIGS. 2A and 2B provide only two perspectives of one implementation of the below-plane infrastructure and does not imply any limitations with regard to for the variable rate water distribution system in which different embodiments may be implemented. For example, the above mentioned components of the variable rate water distribution may be oriented, configured, or arranged in any manner so long that the positioning of the components does not prevent the variable rate water distribution operation, in accordance with embodiments of the present invention.

Supply line 112 transports water from one or more liquid sources to the below-plane infrastructure. In this embodiment, supply line 112 is operatively coupled to sub-supply line 114 such that supply line 112 is normal to sub-supply line 114 and parallel to branch lines 116. In another embodiment, more than one supply line 112 may be disposed in the variable rate water distribution system, such that each supply line 112 is operatively coupled to the one or more liquid sources. Furthermore, each supply line 112 may be independent of or operatively coupled to another supply line 112.

In general, a user may select a length and a diameter of supply line 112 which enables variable rate water distribution system to deliver water to all target water distribution areas. For example, the user may select lengths with respect to each supply line 112, or select combined lengths of a grouping of more than one supply line 112 (e.g., operatively coupled in sequence). The user may also elect a suitable diameter, for example, may be a diameter of supply line 112, such as a diameter capable of transporting water throughout the variable rate water distribution infrastructure at a desired rate, without degrading the system or its components, or posing risks to the environment or any person (e.g., unsafe diameters may lead to unsafe pressure hammering and/or explosions). Accordingly, the length and the diameter of any conduit mentioned in this specification may be based on the user-defined specifications (i.e., considering safety, capacity, role of component, etc.).

Sub-supply line 114 transports water from supply line 112 to one or more branch lines 116. In this embodiment, sub-supply line 114 is operatively coupled to supply line 112 and one or more of branch lines 116. In another embodiment, more than one sub-supply line 114 are disposed in section 110. In various embodiments, a user selects a length and a diameter of sub-supply line 114 which enables the variable water distribution system to deliver water to all target water distribution areas, as described earlier in this specification. In this embodiment, sub-supply line 114 is normal to supply line 112 and branch lines 116.

Each one of branch lines 116 transports water from sub-supply line 114 to one or more rising lines 122. In this embodiment, portions of each one of branch lines 116 are disposed in section 110. Each one of branch lines 116 may be parallel to supply line 112 and normal to sub-supply line 114. In various embodiments, a user can select quantities, lengths, and diameters of branch lines 116 to enable the variable rate water distribution system to deliver water to all target water distribution areas. The variable rate water distribution system may require a larger number of branch lines 116 to increase the resolution of water distribution of the variable water distribution system. For example, a variable water distribution may employ 'n' number of branch lines 116. Another variable water distribution system may deploy '2n' number of branch lines 116. In the variable rate water distribution system with 2n branch lines 116, there can be a greater number of rising lines 122 and drip lines 124, and as a result, the number of emitters can be greater. Accordingly, the variable rate water distribution system may effectively increase the resolution of the variable rate water distribution system. The effective length and the effective diameter of each one of branch lines 116 may be determined by the user specification, as described earlier in this specification.

A plurality of rising lines 122 are disposed in the variable rate water distribution system such that each one of rising lines 122 transports water from one of branch lines 116 to one of drip lines 124, in accordance with an embodiment of the present invention. In this embodiment, each one of rising lines 122 is normal to branch lines 116 and normal to sub-supply line 114. In various embodiments, a user selects a length and a diameter of sub-supply line 114 which enables the variable water distribution system to deliver water to all target water distribution areas, as described earlier in this specification. The variable rate water distribution system may employ a larger number of rising lines 122 to increase the resolution of the variable rate water distribution system. For example, a variable rate water distribution system may employ 'n' number of rising lines 122. Another variable rate water distribution system may deploy '2n' number of branch lines 116. In the variable rate water distribution system with 2n rising lines 122, there may be a greater number of drip lines 124. As a result the number of emitters can be greater, effectively increasing the resolution of the variable rate water distribution system.

Extension components 115 are disposed throughout the variable rate water distribution system, such that each one of extension components 115 is capable of distributing water from sub-supply line 114 to one of branch lines 116. In this embodiment, each one of extension components 115 comprises three conduits (Conduits A, B, and C) that are operatively coupled to one another. In various embodiments, extension components 115 are disposed at each intersection (i.e., points of diversion) between branch lines 116 and sub-supply line 114. In this embodiment, two conduits for each one of extension components 115 are parallel to one another. A proximal end of conduit A and a proximal of conduit B can be operatively coupled to sub-supply line 114. Conduit C is operatively coupled to control elements 128, a proximal end of conduit C is operatively coupled to a distal end of conduit A, a distal end of conduit C is operatively coupled to a distal end of conduit B. A greater or lesser portion of conduit A and conduit B may be below and above plane 130. In this embodiment, conduit C and control elements 128 (not depicted) are entirely above plane 130.

FIG. 3 is an elevation view of a portion of infrastructure 100 for a variable rate water distribution system, comprising drip lines 124 joined by a linking element 126 to a rising line 122, in accordance with an embodiment of the present invention. It should be appreciated that FIG. 3 provides only an illustration of one implementation of the above ground infrastructure and does not imply any limitations with regard to the variable rate water distribution system in which different embodiments may be implemented. For example, the above mentioned components of the variable rate water distribution may be oriented, configured, or arranged in any manner so long that the positioning of the components do not hinder their capacities to deliver water to target water distribution areas and intended functions, in accordance with an embodiment of the present invention. Accordingly, different implementations of the variable rate distribution system may be employed. For example, the portion of infrastructure as described in FIG. 3 may be disposed above a plane, wherein the plane represents a surface of ground for a residential building.

As shown in FIG. 3. an end of drip line 124A is operatively coupled to an input of joint element 126. In this embodiment, an end of sub-supply line 122 is operatively coupled to a second input of joint element 126. An end of drip line 124B is operatively coupled to an output of joint element 126. Joint element 126 also comprises check valve 302. Accordingly, joint element 126 merges liquid flow from drip line 124A and rising line 122, out through drip line 124B, while preventing back-flow into drip line 124A. Check valve 302 permits one-directional flow along axis 310, wherein check valve 302 may be a check valve, flush valve, non-return valve, and/or combinations of any one-way valves known in the art. Drip line 124A, drip line 124B, joint element 126, check valve 302 and a portion of rising line 308 may be above plane 130. In this embodiment, joint element 126 is releasably coupled to rising line 122, drip line 124A, and drip line 124B, such that joint element 126 can be easily removed, replaced, or modified. Accordingly, drip line 124A and drip line 124B are releasably coupled and also have the capacity to be easily removed, modified, or replaced. For example, the target water distribution area may require a different method of delivery (i.e., different types of emitters, lengths of drip lines, etc.). In this instance, the releasable coupling of the above mentioned components provide a user the ability to easily replace drip line 124A and drip line 124B. After removing drip lines 124A and 124B, caps and/or covers can be attached to joint element 126 if drip lines are no longer needed at that particular location.

Figure 4:
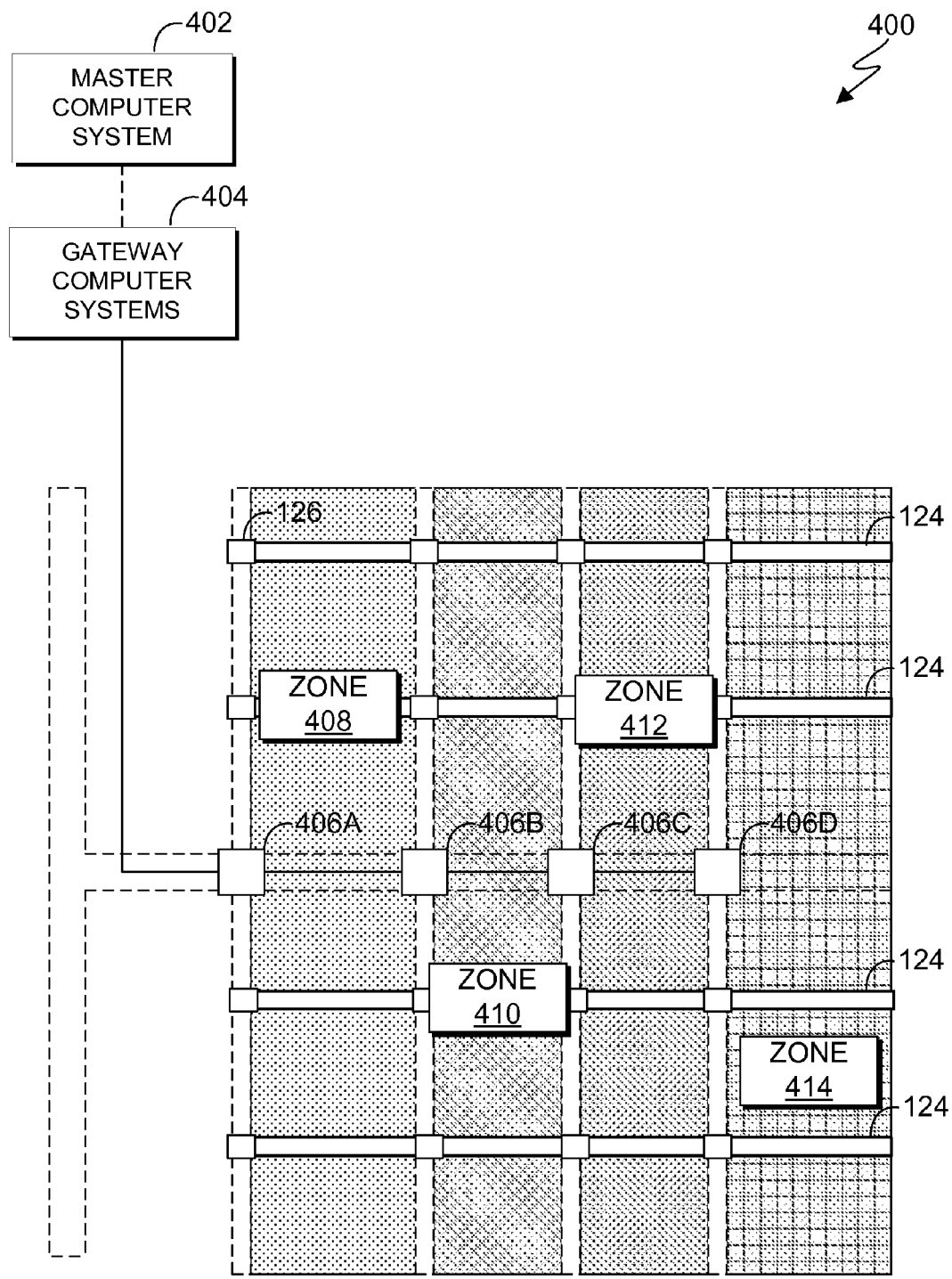
FIG. 4 is a diagram illustrating a communicative network infrastructure for a plurality of zones, in accordance with an embodiment of the present invention.

FIG. 4 is a diagram illustrating a communicative network infrastructure 400 for a plurality of zones, in accordance with an embodiment of the present invention. It should be appreciated that FIG. 4 provides only an illustration of one implementation of communicative network infrastructure 400 and does not imply any limitations with regard to the variable rate water distribution system in which different embodiments may be implemented. In this embodiment of the present invention, the communicative network infrastructure 400 comprises a master computer system 402 and gateway computer systems 404 operatively coupled to control elements 406 of infrastructure 100. For illustrative purposes, FIG. 4 shows an example of infrastructure 100 in which four drip lines 124 are used to distribute liquid to four zones; however, it should be understood that infrastructure 100 can comprise a greater or lesser number of zones. Accordingly, a portion of infrastructure 100 disposed in section 120 is shown (indicated by dashed components). Joint element 126 is depicted to illustrate that components of section 120 are operatively coupled to each one of drip lines 124. In this embodiment, control elements 406 (e.g., control elements 406A, 406B, 406C, and 406D) is associated with zone 408 and is operatively coupled to each one within zone 408. Accordingly, control elements 406 are control elements 128, as described earlier in this specification with regard to FIG. 1. The term "zone", as used herein, refers to a grouping of drip lines operatively coupled to one another or additional components of the variable rate water distribution system (valves, pressure sensors, flow meters, etc.) for a particular target water distribution area, all of which are controlled by one or more control elements 406.

Each one of control elements 406 (e.g., control elements 406A, 406B, 406C, and 406D) are associated with, and operatively coupled to, gateway computer system 404. Accordingly, control elements 406A propagates command logic to control elements 406B once control elements 406A receives command logic from gateway computer system 404. Flow response feedback information for the plurality of drip lines 124 for zone 408 will propagate from control elements 406B to control elements 406A and then gateway computer system 404.

Upon receiving a water distribution program from master computer system 402, gateway computer system 404 can control drip lines 124 within zone 408, zone 410, zone 412, and zone 414 through communications with control elements 406A, control elements 406B, control elements 406C, and control elements 406D, respectively. In an embodiment of the present invention, the water distribution program enables water distribution of the particular target water distribution areas through drip lines 124. Master computer system 402 may receive flow feedback response information of zone 408, zone 410, zone 412, and zone 414. In another embodiment of the present invention, the flow feedback response information is integrated, transmitted, and/or computed at control elements 406A, 406B, 406C and/or 406D. In another embodiment of the present invention, the flow feedback response information is integrated, transmitted, and/or computed at one or more gateway computer systems 404. Implementing the latter two embodiments may reduce the computational demand and network bandwidth of master computer system 402 when operating and monitoring the variable rate water distribution system. For example, as previously discussed, information may propagate to and from control elements 406A and control elements 406B and send/receive information from gateway computer system 404 to control elements 406A. In other embodiments, the size zones 408, 410, 412, and 414 may vary throughout the water distribution area.

For an example, a user may desire to distribute liquid to zone 408. In this instance, control elements 406A may receive instructions to actuate a distribution valve (not depicted), in accordance with a water distribution schedule, such that liquid is transported to drip lines 124 in zone 408. Similarly, if a user desires to distribute liquid to zone 408 and zone 414, then control elements 406A and control elements 406D may receive instructions to actuate the distribution valve in both control elements 406A and 406D, in accordance with a water distribution schedule, such that liquid is transported to drip lines 124 in zones 408 and 414. For example, a water distribution schedule can comprise instructions that instruct control nodes of control elements 406 to actuate water distribution valves of control elements 406 for specified durations of time, such that controlled amounts of liquid flow to designated zones via drip lines 124.

Figure 5:
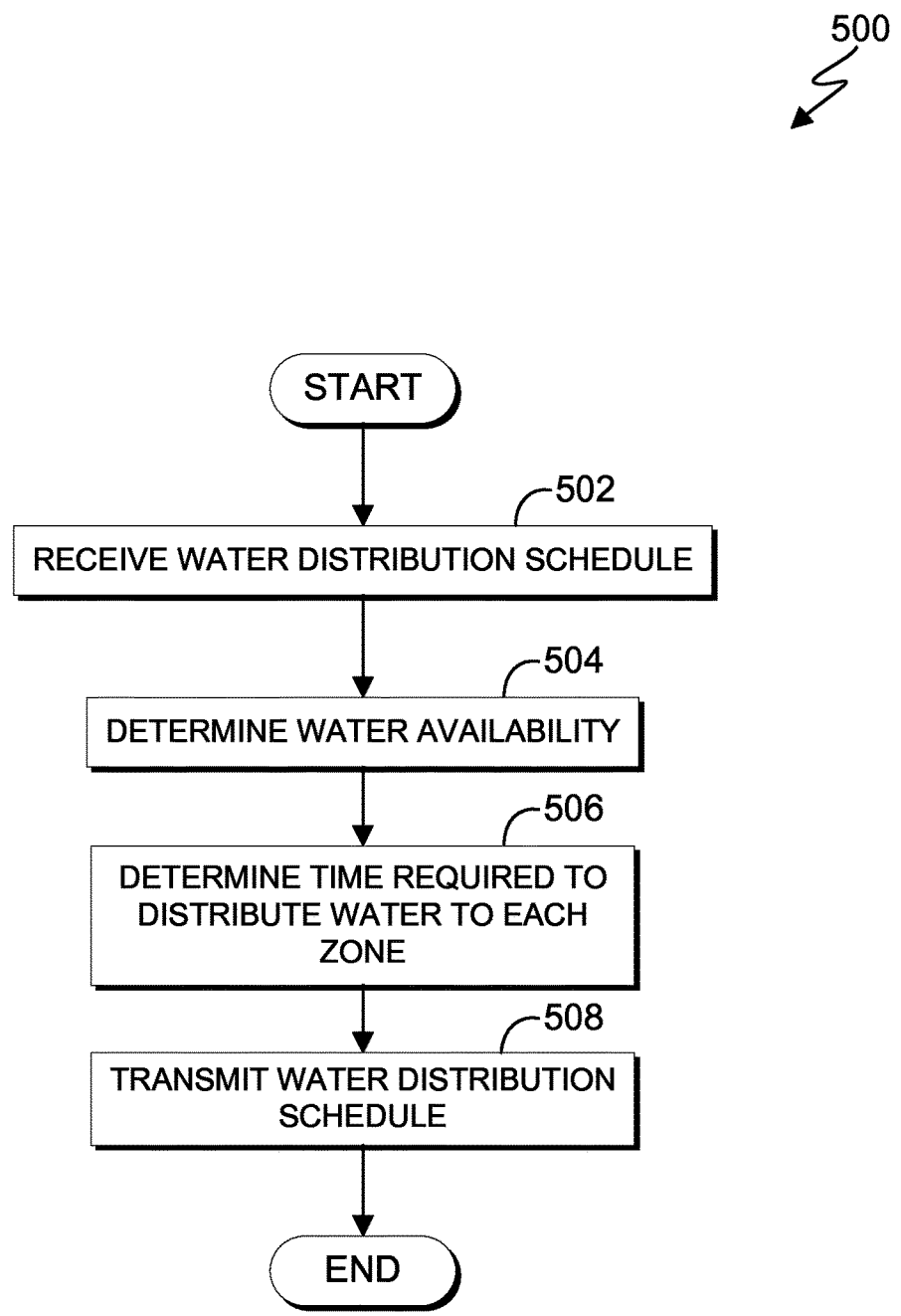
FIG. 5 is a flow chart illustrating operational steps for distributing water to target distribution areas, in accordance with an embodiment with the present invention.

In zone 408, zone 410, and zone 412, a wireless or wired communication network may be implemented. Wireless technologies such as mesh network, Zigbee, Dust technology, broadcasting technologies or any other wireless communication technology known in the art may be implemented. Wired technologies such as serial RS232, serial differential 5485, power line communication or any other wired communication technology known in the art may be implemented. In certain embodiments of the present invention, a combination of both wired and wireless communication technologies are implemented FIG. 5 is a flow chart 500 illustrating operational steps for distributing water to target distribution areas, using the communicative network infrastructure 400, in accordance with an embodiment with the present invention.

In step 502, master computer system 402 receives a water distribution schedule. The water distribution schedule may be transmitted from a remote server and received by master computer system 402. In another embodiment, the water distribution schedule may be manually programmed and/or stored in master computer system 402. In this embodiment, the water distribution schedule indicates which water distribution areas (i.e., zones) require distribution.

In step 504, master computer system 402 determines water availability (i.e., quantity of water available) in the one or more liquid sources. Water availability may be a dynamic resource, and in certain instances of the present invention, master computer system 402 may determine that the water availability is not sufficient to deliver water to all target water distribution areas. In such cases, master computer system 402 modifies the water distribution schedule in accordance with the quantity of water available. For example, master computer 402 can scale down all liquid distribution by a specific percentage, or can prioritize distribution to certain zones based on a user specifications.

In step 506, master computer system 402 determines the time required to distribute water to each zone. In addition, master computer system 402 models transient pressure changes with respect to time and determines a method to distribute water, such that the desired target water distribution areas receive water while minimizing system degradation (i.e., maintaining safety, minimizing pressure hammering effects, etc.). In some embodiments, master computer system 402 utilizes a modeling software (e.g, EPANET), which predicts liquid flow interactions and models flow behavior for water distribution schedules.

In step 508, master computer system 402 transmits the water distribution schedule, to gateway computer systems 404, which in turn issue instructions to control elements 406 to distribute water, in accordance with the distribution schedule. Master computer system 402 may employ the communicative network infrastructure as described earlier with regard to FIG. 4. In this embodiment of the present invention, master computer system 402 transmits the water distribution schedule using a combination of wireless and wired communications as described earlier with regard to FIG. 4. For illustrative purposes, it should be understood that, a water distribution program (e.g., may include operations for flushing systems, performing remote diagnostics, etc.) may be received, processed, and transmitted by master computer system 402 in accordance with an embodiment of the present invention.

Figure 6:
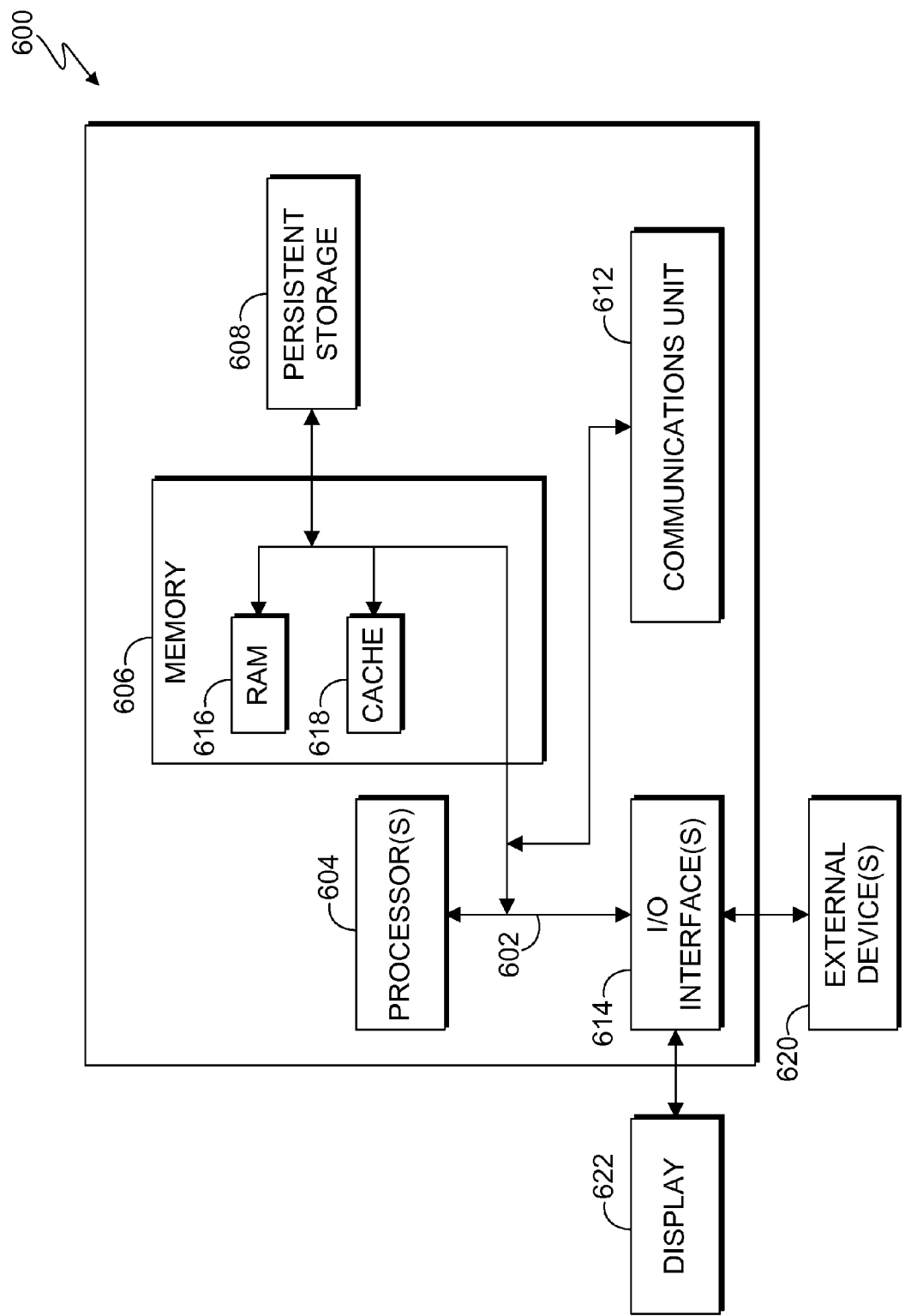
FIG. 6 is a block diagram of internal and external components of the computer systems of FIG. 4, in accordance with an embodiment of the present invention.

FIG. 6 is a computer system 600 that includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software and data is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., the network infrastructure in FIG. 4). In this embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus for distributing water, the apparatus comprising:
    a sub-supply line located on a first side of a plane, wherein an inlet of the sub-supply line is operatively coupled to a liquid source and an outlet of the sub-supply line is operatively coupled to an inlet of a first portion of an extension component;
    the first portion of the extension component located at least on the first side of the plane, wherein an outlet of the first portion of the extension component includes a first releasable coupling to an inlet of the second portion of the extension component, and wherein the first releasable coupling is located on the second side of the plane;
    the second portion of the extension component located on the second side of the plane including at least one control element located configured to regulate flow;
    a branch line located on the first side of the plane, wherein an inlet of the branch line is operatively coupled to an outlet of a third portion of the extension component and an outlet of the branch line is operatively coupled to an inlet of a first portion of a rising line;
    the third portion of the extension component located at least on the second side of the plane, wherein the third portion of the extension component passes through the plane to the first side of the plane;
    the first portion of the rising line located at least on the first side of the plane, wherein an outlet of the first portion of the rising line includes a second releasable coupling to an inlet of a second portion of the rising line, and wherein the second releasable coupling is located on the second side of the plane;
    the second portion of the rising line located on the second side of the plane, wherein an outlet of the second portion of the rising line is operatively coupled to a drip line using a third releasable coupling;
    the drip line located on the second side of the plane configured to dispense liquid;

a communicative network operatively coupled to the at least one control element; and one or more sensors located on the second side of the plane configured to monitor and transmit flow feedback information to components of the communicative network, wherein each of the one or more sensors is operatively coupled to the apparatus using a releasable coupling.

2. The apparatus of claim 1, wherein the at least one control element comprises:

a control node operatively coupled to a distribution valve to control whether the distribution valve allows flow of liquid through drip line.

3. The apparatus of claim 1, wherein the first side of the plane is below ground and the second side of the plane is above ground.

4. The apparatus of claim 2, wherein one of the components of the communicative network includes a gateway computer system operatively coupled to the control node to transmit instructions for actuating the distribution valve.

5. The apparatus of claim 4, wherein another one of the components of the communicative network includes a master computer system operatively coupled to the gateway computer system to transmit a distribution schedule to the gateway computer system.

6. The apparatus of claim 5, wherein the distribution schedule comprises a specified amount of time that the distribution valve should be open.

7. The apparatus of claim 6, wherein the apparatus further comprises:

a plurality of extension components, wherein each of the plurality of extension components includes a respective control node operatively coupled to a distribution valve to control whether the distribution valve allows or blocks flow of liquid through a sub-supply line, or a branch line and the supply line to which the distribution valve is coupled; and wherein each control node is configured to actuate a corresponding distribution valve in a sequential order to reduce pressure hammering effects in the apparatus.

* * * * *